(12) United States Patent
Kanou et al.

(10) Patent No.: US 11,195,349 B2
(45) Date of Patent: Dec. 7, 2021

(54) EXTERNAL-WORLD RECOGNITION SYSTEM

(71) Applicant: HONDA MOTOR CO., LTD., Tokyo (JP)

(72) Inventors: Tadahiko Kanou, Wako (JP); Jun Ochida, Wako (JP); Hiroaki Horii, Wako (JP); Takashi Kuboshima, Wako (JP); Ken Hanayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 16/474,190

(22) PCT Filed: Oct. 17, 2017

(86) PCT No.: PCT/JP2017/037455
§ 371 (c)(1),
(2) Date: Jun. 27, 2019

(87) PCT Pub. No.: WO2018/123217
PCT Pub. Date: Jul. 5, 2018

(65) Prior Publication Data
US 2019/0347878 A1    Nov. 14, 2019

(30) Foreign Application Priority Data
Dec. 28, 2016 (JP) .............................. JP2016-255012

(51) Int. Cl.
*G07C 5/08* (2006.01)
*G06T 7/80* (2017.01)
(Continued)

(52) U.S. Cl.
CPC ......... *G07C 5/0808* (2013.01); *G05D 1/0246* (2013.01); *G06K 9/00791* (2013.01);
(Continued)

(58) Field of Classification Search
CPC  G07C 5/0808; G06T 7/80; G06T 7/70; G06T 2207/30244; G05D 1/0246;
(Continued)

(56) References Cited

U.S. PATENT DOCUMENTS 7,684,945 B2 * 3/2010 Walter ................... B60T 8/172
702/96
2003/0036847 A1 * 2/2003 Geier ................... G01C 21/165
701/472

(Continued)

FOREIGN PATENT DOCUMENTS

JP    2000-028632 A    1/2000
JP    2010-197280 A    9/2010
(Continued)

OTHER PUBLICATIONS

PCT/ISA/210 from International Application PCT/JP2017/037455 with the English translation thereof.

*Primary Examiner* — Thomas Ingram
(74) *Attorney, Agent, or Firm* — Carrier Blackman & Associates, P.C.; Joseph P. Carrier; Jeffrey T. Gedeon

(57) ABSTRACT

An external-world recognition system includes: a satellite positioning device that measures the position of a vehicle by receiving radio waves transmitted from artificial satellites; a yaw rate sensor that detects or estimates the movement of the vehicle; a camera that acquires external-world information about the surroundings of the vehicle; and an external-world recognition device that recognizes external-world information considering a reference direction as the center. The external-world recognition device corrects a detection value from the yaw rate sensor on the basis of time-series positions of the vehicle as measured by the satellite positioning device and corrects the reference direction on the basis of the corrected detection value.

2 Claims, 10 Drawing Sheets

(51) Int. Cl.
*G06T 7/70* (2017.01)
*G05D 1/02* (2020.01)
*G06K 9/00* (2006.01)

(52) U.S. Cl.
CPC .................. *G06T 7/70* (2017.01); *G06T 7/80* (2017.01); *G05D 2201/0213* (2013.01); *G06T 2207/30244* (2013.01)

(58) Field of Classification Search
CPC ........... G05D 2201/0213; G05D 1/027; G05D 1/0274; G06K 9/00791; G08G 1/16
See application file for complete search history.

(56) References Cited

U.S. PATENT DOCUMENTS

| | | | |
|---|---|---|---|
| 2009/0265054 A1* | 10/2009 | Basnayake | B60W 40/114 701/31.4 |
| 2010/0217517 A1* | 8/2010 | Oohashi | G01C 21/30 701/533 |
| 2011/0238252 A1* | 9/2011 | Takeda | B60W 40/076 701/31.4 |
| 2012/0116676 A1* | 5/2012 | Basnayake | G01C 21/30 701/469 |
| 2013/0136301 A1* | 5/2013 | Abrahamsson | G06K 9/00577 382/103 |
| 2013/0231825 A1* | 9/2013 | Chundrlik, Jr. | G01P 3/50 701/29.1 |

FOREIGN PATENT DOCUMENTS

| | | |
|---|---|---|
| JP | 2011-169728 A | 9/2011 |
| JP | 2011-221983 A | 11/2011 |

\* cited by examiner

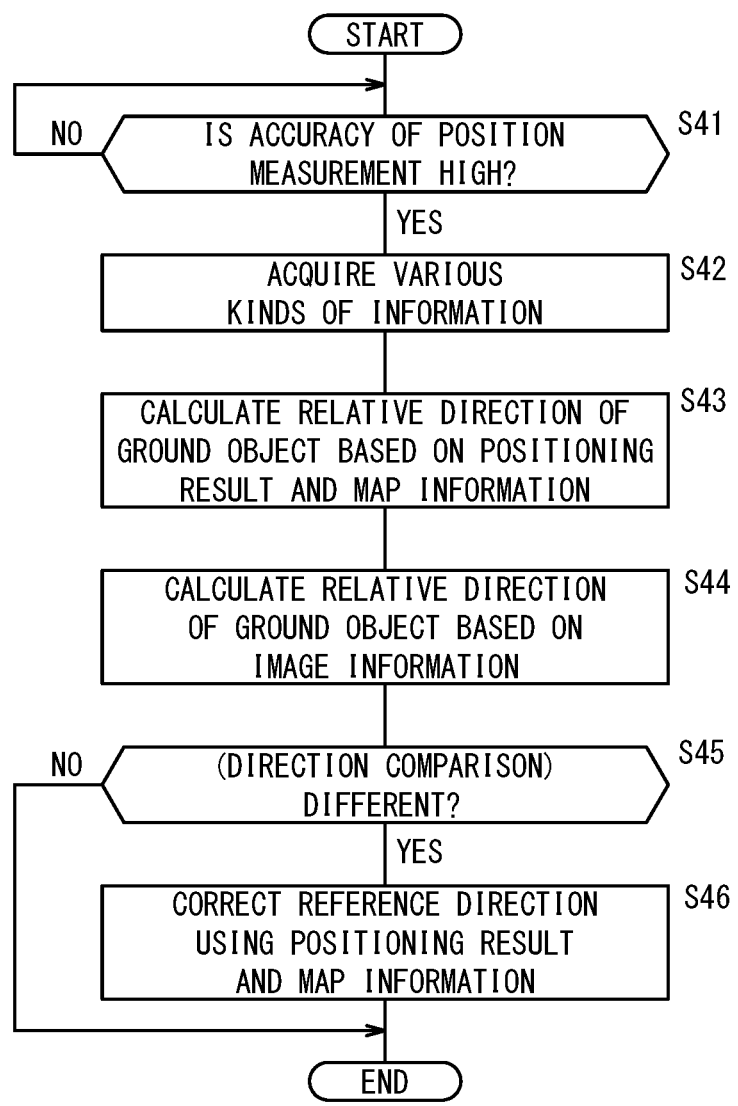

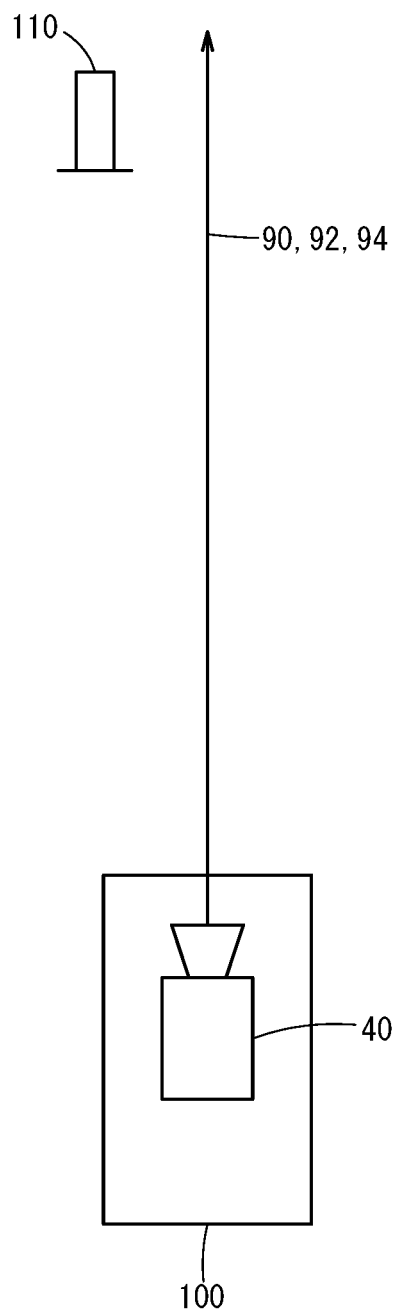
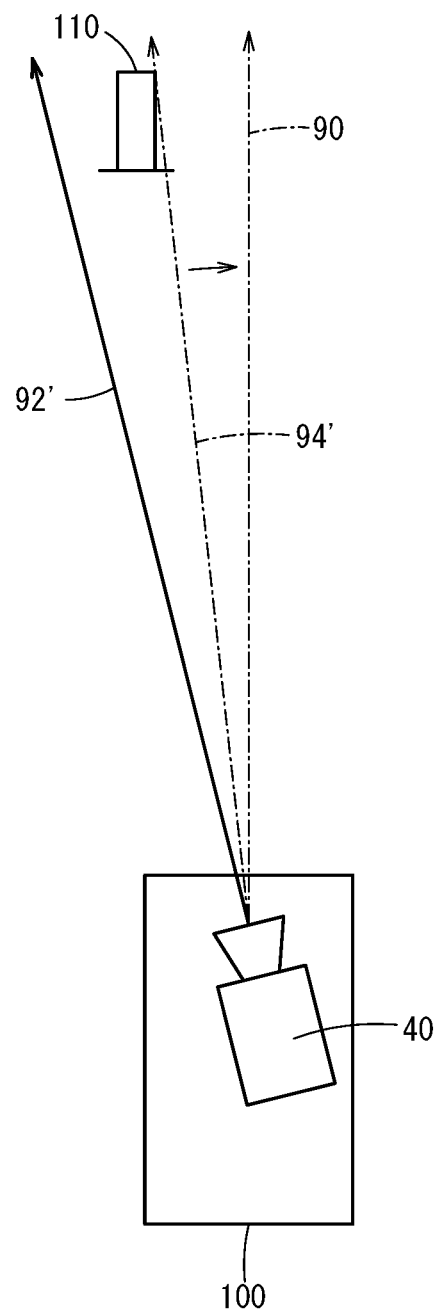

EXTERNAL-WORLD RECOGNITION SYSTEM

TECHNICAL FIELD

The present invention relates to an external environment recognition system (external-world recognition system) that acquires external environment information around a vehicle with an external environment sensor, such as a camera, and recognizes the external environment information with an external environment recognition device. More particularly, it relates to an external environment recognition system that corrects the direction in which the external environment recognition device performs recognition.

BACKGROUND ART

Japanese Laid-Open Patent Publication No. 2011-169728 discloses a device that corrects a yaw rate detected by a yaw rate sensor. The device estimates the yaw rate of the host vehicle based on image information captured by a vehicle-mounted camera, and uses the estimated yaw rate to correct the yaw rate detected by the yaw rate sensor.

Image information captured by the camera is recognized by an external environment recognition device (for example, a recognition ECU). Typically, the optical axis direction of the camera is aligned with the direction to be recognized (a direction in the external environment which is to be recognized), after which the optical axis direction of the camera is set as a reference direction of the external environment recognition device (the direction of recognition).

SUMMARY OF INVENTION

The posture of the camera changes due to vibration of the vehicle, contact with an occupant, and the like. Along with a change in the posture of the camera, the optical axis direction of the camera and the reference direction of the external environment recognition device become misaligned with the direction to be recognized. This causes an error in position information of a recognition target determined from a recognition result of the external environment recognition device. Japanese Laid-Open Patent Publication No. 2011-169728 does not take into consideration correcting of a recognition result of the external environment recognition device.

The present invention was made in view of such a challenge and an object thereof is to provide an external environment recognition system capable of accurately correcting a reference direction established for an external environment recognition device and accurately recognizing the positions of recognition targets around a vehicle.

An external environment recognition system according to a first aspect of the present invention includes: a satellite positioning device configured to measure a position of a vehicle by receiving radio waves transmitted from artificial satellites; a vehicle sensor configured to detect or estimate a behavior of the vehicle; an external environment sensor configured to acquire external environment information around the vehicle; and an external environment recognition device configured to recognize the external environment information centered in a reference direction, wherein the external environment recognition device is configured to correct a detected value of the vehicle sensor based on positions of the vehicle in temporal sequence measured by the satellite positioning device and correct the reference direction based on the corrected detected value.

In the first aspect, the external environment recognition device may be configured to determine a traveled trajectory of the vehicle based on the positions of the vehicle in temporal sequence measured by the satellite positioning device, correct the detected value of the vehicle sensor based on the traveled trajectory, and correct the reference direction based on the corrected detected value.

With the configuration above, the detected value of the vehicle sensor is initially corrected using the satellite positioning device, which provides position measurement of high accuracy, followed by correction of the reference direction of the external environment recognition device using the corrected detected value of the vehicle sensor. Thus, a misalignment in the reference direction established for the external environment recognition device can be accurately corrected. As a result, it becomes possible to accurately recognize the positions of recognition targets around the vehicle.

An external environment recognition system according to a second aspect of the present invention includes: a satellite positioning device configured to measure a position of a vehicle by receiving radio waves transmitted from artificial satellites; a storage device configured to store a position of a ground object; an external environment sensor configured to acquire external environment information for the vehicle; and an external environment recognition device configured to recognize the external environment information centered in a reference direction, wherein the external environment recognition device is configured to correct the reference direction based on the position of the vehicle measured by the satellite positioning device and on the position of the ground object stored in the storage device.

In the second aspect, the external environment recognition device may be configured to determine a relative direction of the ground object with respect to the vehicle based on the position of the vehicle measured by the satellite positioning device and on the position of the ground object stored in the storage device, and correct the reference direction based on the relative direction.

With the configuration above, a misalignment in the reference direction established for the external environment recognition device can be accurately corrected because the reference direction of the external environment recognition device is corrected using the satellite positioning device, which provides position measurement of high accuracy. As a result, it becomes possible to accurately recognize the positions of recognition targets around the vehicle.

In the first or second aspect, the external environment recognition device may be configured to perform processing to correct the reference direction when reliability of measurement by the satellite positioning device is higher than a predetermined reliability. With this configuration, a misalignment in the reference direction established for the external environment recognition device can be corrected more accurately.

The present invention can accurately correct a misalignment in the reference direction established for the external environment recognition device. As a result, it becomes possible to accurately recognize the positions of recognition targets around the vehicle.

BRIEF DESCRIPTION OF DRAWINGS

FIG. 7 is a flowchart of correction processing according to a second embodiment;

FIG. 8A illustrates the optical axis of a camera with a proper pan angle and a ground object, and FIG. 8B illustrates the optical axis of a camera with an improper pan angle and a ground object;

DESCRIPTION OF EMBODIMENTS

An external environment recognition system according to the present invention is described below by showing preferred embodiments with reference to the accompanying drawings.

1 Configuration of Vehicle Control System 10

The external environment recognition system according to the present invention forms part of a vehicle control system 10 mounted on a vehicle 100. In the following, the vehicle control system 10 is described with description of an external environment recognition system 12.

1.1 Overall Configuration

Figure 1:
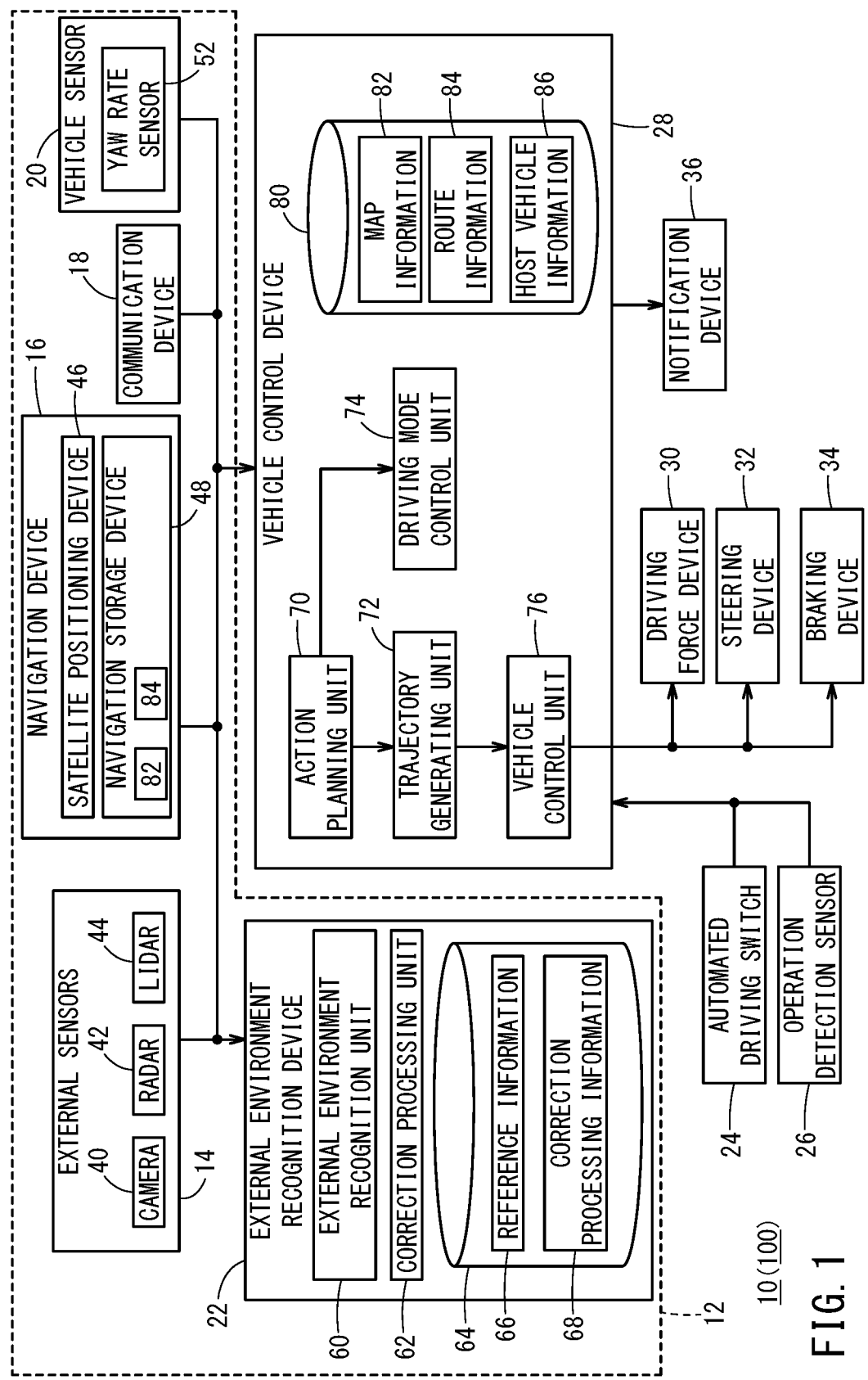
FIG. 1 is a block diagram showing a configuration of a vehicle control system that includes an external environment recognition system according to an embodiment of the present invention.

With reference to FIG. 1, the vehicle control system 10 is described. The vehicle control system 10 is incorporated in the vehicle 100 and controls the travel of the vehicle 100 by automated driving or manual driving. The term "automated driving" is a concept that encompasses not only "fully automated driving", which controls the travel of the vehicle 100 entirely automatically, but also "partially automated driving" and "driving assistance", which control travel partially automatically.

The vehicle control system 10 basically includes an input system device group, an external environment recognition device 22, a vehicle control device 28, and an output system device group. The devices that form the input system and output system device groups are connected with the external environment recognition device 22 and/or with the vehicle control device 28 via a communication line. The external environment recognition device 22 and the vehicle control device 28 are connected with each other via a communication line.

The input system device group includes external environment sensors 14, a navigation device 16, a communication device 18, a vehicle sensor 20, an automated driving switch 24, and an operation detection sensor 26 connected with operation devices (not shown). The output system device group includes a driving force device 30 for driving wheels (not shown), a steering device 32 for steering the wheels, a braking device 34 for braking the wheels, and a notification device 36 that notifies a driver mainly visually, audibly, or tactilely.

Some of the input system devices (the external environment sensors 14, the navigation device 16, the communication device 18, and the vehicle sensor 20) and the external environment recognition device 22 form the external environment recognition system 12.

1.2 Specific Configuration of Input System Device Group

The external environment sensors 14 acquire information indicating an external environment state of the vehicle 100 (hereinafter, external environment information) and outputs the external environment information to the external environment recognition device 22. Specifically, the external environment sensors 14 include one or more cameras 40, one or more radars 42, and one or more LIDARs 44 (Light Detection and Ranging, Laser Imaging Detection and Ranging). At the stage of shipment of the vehicle 100, the detection direction of each sensor [such as an optical axis direction 92 of the camera 40 (see FIG. 4A)] is defined, for example, as a relative direction to a front-back direction 90 of the vehicle 100. In this embodiment, the detection direction of each sensor coincides with (is parallel to) the front-back direction 90 of the vehicle 100.

The navigation device 16 includes a satellite positioning device 46, a navigation storage device 48, and user interfaces, not illustrated (for example, a touch panel display, a speaker, and a microphone). The navigation device 16 uses information detected by the satellite positioning device 46, the vehicle sensor 20, and the like to measure the current position (the position of travel) of the vehicle 100, and generates a travel route from that position to a destination specified by the user.

The satellite positioning device 46 measures the current position of the vehicle 100 by receiving radio waves transmitted from artificial satellites. The satellite positioning device 46 is able to measure the latitude and longitude of the current position if it can communicate with three artificial satellites simultaneously, and is able to measure the altitude of the current position in addition to the latitude and longitude if it can communicate with four or more artificial satellites simultaneously. As there are more artificial satellites with which communication is possible, the accuracy of position measurement increases and its reliability is improved.

The navigation storage device 48 stores the travel route generated by the navigation device 16 as route information 84 and also stores map information 82. The map information 82 is acquired via the communication device 18 or via a recording medium (not shown).

The communication device 18 is configured to be capable of communication with roadside equipment, other vehicles, and external devices including a server, and transmits and receives information relating to traffic equipment (such as traffic signals), information relating to other vehicles, probe information, or the latest map information 82, for example. The pieces of information are output to the external environment recognition device 22 or to the vehicle control device 28.

The vehicle sensor 20 includes a yaw rate sensor 52 for detecting an angular speed about a vertical axis, as well as various sensors, not illustrated, such as a speed sensor for detecting a vehicle velocity (vehicle speed) V, an acceleration sensor for detecting an acceleration, a lateral acceleration sensor for detecting a lateral acceleration, and a direction sensor for detecting orientation and direction, and a gradient sensor detecting a gradient. Signals detected by each sensor are output to the external environment recognition device 22 and/or the vehicle control device 28 and stored in a memory 80 as host vehicle information 86.

The automated driving switch 24 is a button switch provided on a steering wheel, an instrument panel, and the like, for example. The automated driving switch 24 is configured to be capable of switching between multiple driving modes through manual operation by a user, including the driver. The automated driving switch 24 outputs a mode switching signal to the vehicle control device 28.

The operation detection sensor 26 detects the presence or absence of the driver's operation, the amount of operation, and the position of operation on various operation devices, not illustrated, such as an accelerator pedal, a steering wheel, a brake pedal, a shift lever, and a direction indicator lever, for example. The operation detection sensor 26 outputs, as detection results, the amount of pressing on the accelerator (accelerator opening amount), the amount of steering operation (the amount of steering), the amount of pressing on the brake, the shift position, the direction of a right/left turn, and the like to the vehicle control device 28.

1.3 Specific Configuration of Output System Device Group

The driving force device 30 includes a driving force electronic control unit (ECU) and drive sources including an engine and a traction motor. The driving force device 30 generates driving force (torque) for the traveling of the vehicle 100 in accordance with a vehicle control value output from a vehicle control unit 76 and transfers it to the wheels via a transmission, or directly.

The steering device 32 includes an electric power steering system (EPS) ECU and an EPS actuator. The steering device 32 changes the orientation of the wheels (steered wheels) in accordance with a vehicle control value output from the vehicle control unit 76.

The braking device 34 is an electric servo brake used in combination with a hydraulic brake, for example, and includes a brake ECU and a brake actuator. The braking device 34 brakes the wheels in accordance with a vehicle control value output from the vehicle control unit 76.

The notification device 36 includes a notification ECU, a display device, an audio device, and a haptic device. The notification device 36 performs notification operation relating to automated driving or manual driving in accordance with a notification command output from the vehicle control device 28. At the time of notification operation, the notification ECU controls one or more of the display device, the audio device, and the tactile device. At that time, the notification ECU may change the device to be operated and/or the operation itself in accordance with the content of the notification.

1.4 Configuration of External Environment Recognition Device 22

The external environment recognition device 22 includes one or more ECUs and includes the memory 64 and various function implementing components. In this embodiment, the function implementing components are software functional components, which implement their functions by the execution of programs stored in the memory 64 by a central processing unit (CPU). The function implementing components may also be realized as hardware functional components, formed of an integrated circuit such as field-programmable gate array (FPGA). The function implementing components include an external environment recognition unit 60 and a correction processing unit 62.

The external environment recognition unit 60 recognizes static external environment information around the vehicle 100 using the external environment information acquired by the external environment sensors 14, the map information 82 from the navigation device 16, and the like, and generates external environment recognition information. The static external environment information includes, for example, recognition targets such as lane markings, stop lines, traffic lights, traffic signs, ground objects (real estate), travel possible zones, and passing zones or emergency bays. The external environment recognition unit 60 recognizes dynamic external environment information around the vehicle 100 using the external environment information acquired by the external environment sensors 14, information received by the communication device 18, and the like, and generates external environment recognition information. The dynamic external environment information includes, for example, obstacles such as parked or stopped vehicles, traffic participants such as pedestrians and other vehicles (including bicycles), and traffic signals (the signal colors of traffic lights). The dynamic external environment information also includes information on the moving direction of each recognition target. The external environment recognition unit 60 recognizes the position of each recognition target based on a positioning result of the satellite positioning device 46 and the map information 82 from the navigation device 16. Before shipment of the vehicle 100, a reference direction 94 to be recognized by the external environment recognition device 22 is set to the same direction as the direction to be detected by each sensor (for example, the optical axis direction 92) (see FIG. 4A).

Figure 5A:
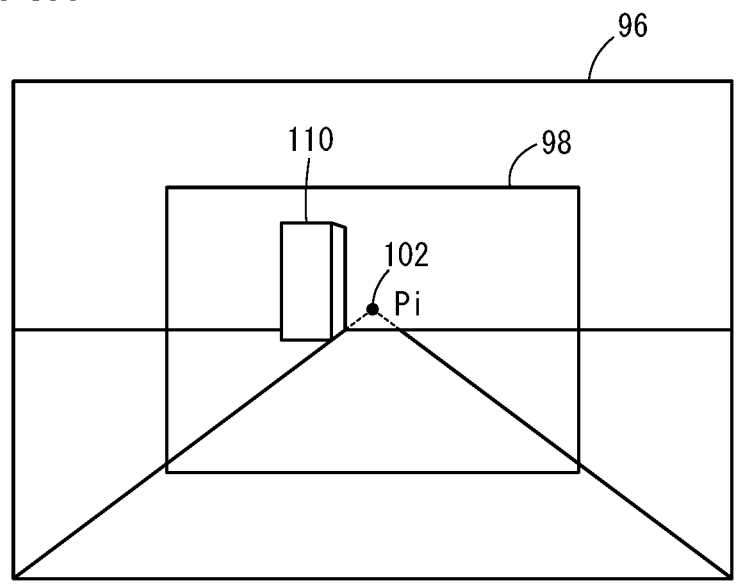
FIG. 5A illustrates an image and the recognition zone captured with the proper posture of the camera.

The correction processing unit 62 performs the process described below in [2] and [3] to correct the reference direction 94. The memory 64 stores various programs as well as reference information 66 and correction processing information 68. The reference information 66 is information indicating the reference direction 94, and is stored, for example, as information on an amount of misalignment relative to the direction of the optical axis direction 92. The correction processing information 68 includes external environment information which is acquired by the external environment sensors 14 when correction processing on the reference direction 94 is performed, information on the position of the vehicle 100 as measured by the satellite positioning device 46 and the time of measurement, and information detected by the vehicle sensor 20. Further, the memory 64 stores the position of a vanishing point 102 which is recognized by the external environment recognition device 22 while the vehicle 100 is moving straight on a straight road, that is, the position of the vanishing point 102 within a recognition zone 98 (see FIG. 5A). This is called an initial position Pi of the vanishing point 102.

[1.5 Configuration of Vehicle Control Device 28]

The vehicle control device 28 includes one or more ECUs and includes the memory 80 and various function implementing components, as with the external environment recognition device 22. The function implementing components include an action planning unit 70, a trajectory generating unit 72, a driving mode control unit 74, and a vehicle control unit 76.

The action planning unit 70 creates an action plan (a temporal sequence of events) for each travel section based on the recognition result of the external environment recognition device 22 and updates the action plan where necessary. Event types may include decelerating, accelerating, branching, merging, lane keeping, lane changing, and overtaking, for example. Here, "decelerating" and "accelerating" are the events of decelerating and accelerating the vehicle 100, respectively. "Branching" and "merging" are the events of making the vehicle 100 smoothly travel at a branching point and a merge point, respectively. "Lane changing" is the event of making the vehicle 100 change the travel lane. "Overtaking" is the event of making the vehicle 100 overtake another vehicle ahead. "Lane keeping" is the event of making the vehicle 100 travel so as not to deviate from the travel lane and is segmented according to combination with a travel pattern. Specific examples of the travel pattern include a constant speed travel, a following travel, a decelerated travel, a curve travel, and an obstacle avoiding travel.

The trajectory generating unit 72 uses the map information 82, the route information 84, and the host vehicle information 86 retrieved from the memory 80 to generate a planned travel trajectory conforming to the action plan created by the action planning unit 70. This planned travel trajectory is data that indicates target behaviors in temporal sequence, more specifically, a data set in temporal sequence with the data units each including a position, a posture angle, speed, acceleration/deceleration, a curvature, a yaw rate, and a steering angle.

The driving mode control unit 74 performs transition processing from the manual driving mode to the automated driving mode or from the automated driving mode to the manual driving mode in accordance with a signal output from the automated driving switch 24. The driving mode control unit 74 also performs transition processing from the automated driving mode to the manual driving mode in accordance with a signal output from the operation detection sensor 26.

The vehicle control unit 76 determines vehicle control values for controlling the travel of the vehicle 100 in accordance with the planned travel trajectory generated by the trajectory generating unit 72. Then, the vehicle control unit 76 outputs the respective vehicle control values it determined to the driving force device 30, the steering device 32, and the braking device 34.

2 First Embodiment 2.1 Processing Performed by External Environment Recognition System 12

Figure 2:
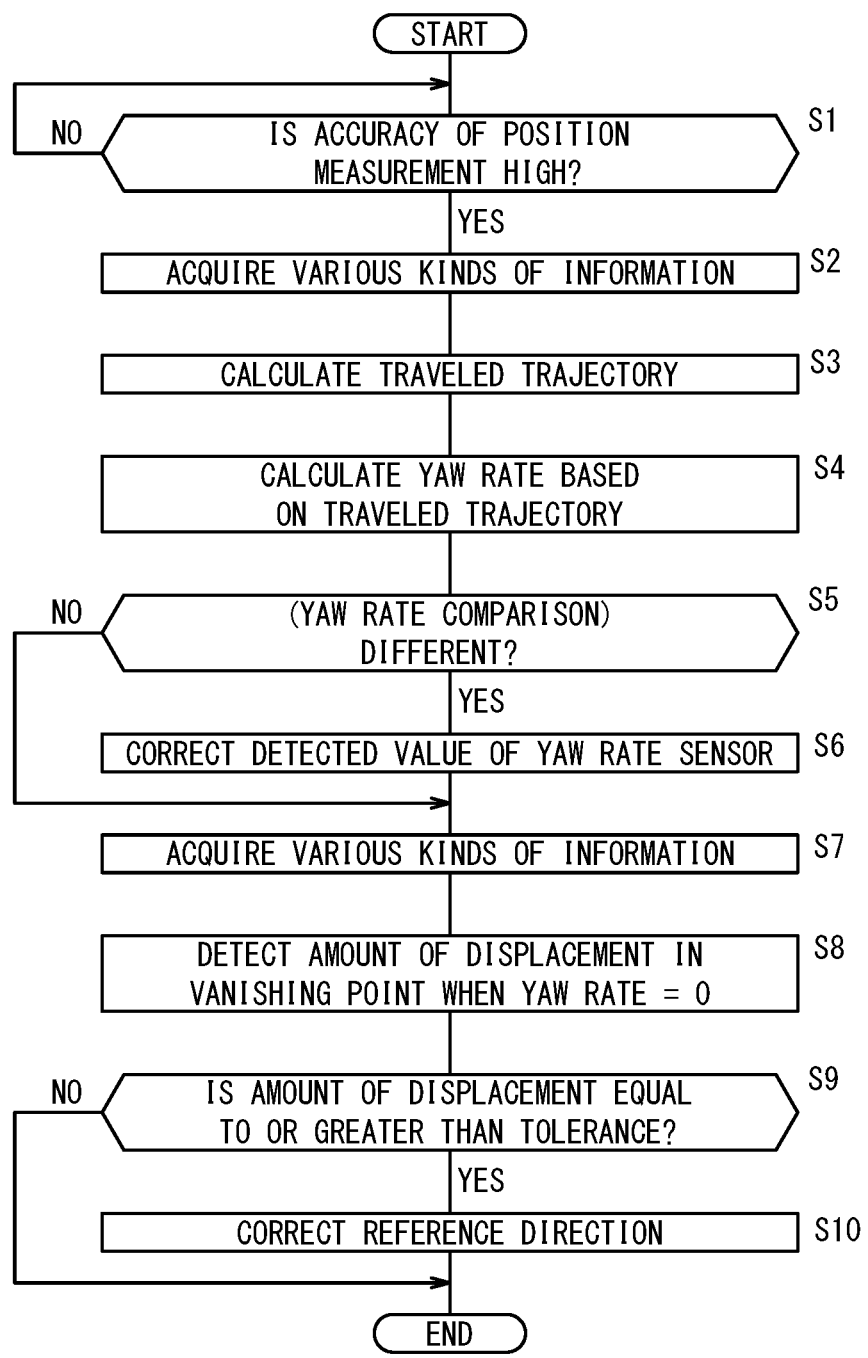
FIG. 2 is a flowchart of correction processing according to a first embodiment.

With reference to FIG. 2, processing performed by the external environment recognition system 12 of a first embodiment is described. The processing shown in FIG. 2 may be executed when the driver performs a given operation, executed at a given timing, such as at the time of powering up of the vehicle 100, or executed periodically. In the first embodiment, a traveled trajectory of the vehicle 100 is used for correction of the reference direction 94. For calculating the traveled trajectory of the vehicle 100, it is necessary for the vehicle 100 to travel a certain distance or more.

At step S1, the satellite positioning device 46 determines whether the accuracy of position measurement is high or not. Specifically, it determines whether the number of artificial satellites from which radio waves can be received is equal to or higher than a predetermined number stored in the navigation storage device 48. Herein, it is preferable that radio waves from at least four artificial satellites are received. If the number is equal to or higher than the predetermined number, that is, if the reliability is high (step S1: YES), the process moves on to step S2. By contrast, if the number is less than the predetermined number, that is, if the reliability is low (step S1: NO), the process at step S1 is performed again.

At step S2, various kinds of information required for the correction processes at steps S3 to S6 are acquired. The satellite positioning device 46 measures the position of the vehicle 100 while the vehicle 100 travels a certain distance or more. The measurement result (position S) is stored in the memory 64 of the external environment recognition device 22 as the correction processing information 68 in temporal sequence. Also, the yaw rate sensor 52 detects a yaw rate Y2 (see FIG. 3). The detected value (yaw rate Y2) is stored in the memory 64 of the external environment recognition device 22 as correction processing information 68 in temporal sequence.

Figure 3:
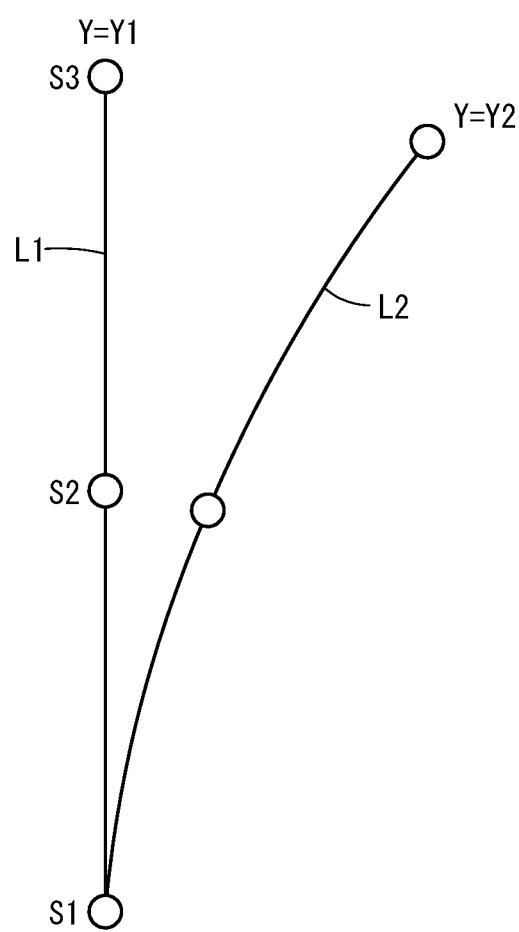
FIG. 3 is a diagram comparing a yaw rate calculated based on the position of travel with a yaw rate detected by a yaw rate sensor.

At step S3, the correction processing unit 62 calculates a traveled trajectory L1 of the vehicle 100 (see FIG. 3) based on the measurement result (position S) of the satellite positioning device 46 stored as the correction processing information 68. The traveled trajectory L1 shown in FIG. 3 is determined by linear interpolation using three measurement results (positions S1 to S3). At step S4, the correction processing unit 62 calculates a yaw rate Y1 based on the traveled trajectory L1. For example, it calculates the vehicle speed V of the vehicle 100 (the amount of positional change per unit time) based on the measurement result of the satellite positioning device 46 and calculates the yaw rate Y1 from a radius of curvature R of the traveled trajectory L1 and the vehicle speed V (Y1=V/R).

At step S5, the correction processing unit 62 compares the yaw rate Y1 determined by calculation with the yaw rate Y2 detected by the yaw rate sensor 52. If the yaw rate Y1 and the yaw rate Y2 are different, the process moves on to step S6. By contrast, if the yaw rate Y1 and the yaw rate Y2 agree (substantially agree) with each other, the process moves on to step S7.

At step S6, the correction processing unit 62 corrects the detected value of the yaw rate sensor 52. Here, regarding the yaw rate Y1 as the true value, the amount of disagreement of the yaw rate Y2 relative to the yaw rate Y1 is used as a correction value Sa. The correction value Sa is a numerical value for converting the detected value of the yaw rate sensor 52 to the true value. The correction processing unit 62 stores the correction value Sa in the memory 64 and also outputs it to the vehicle control device 28. The vehicle control device 28 stores the correction value Sa in the memory 80.

At step S7, various kinds of information are acquired again. The camera 40 acquires image information, and the yaw rate sensor 52 detects a yaw rate Y2A (=the value of the yaw rate Y2 after correction with the correction value Sa). At step S8, the correction processing unit 62 detects the amount by which the vanishing point 102 recognized by the external environment recognition unit 60 when the vehicle 100 is moving straight (when the yaw rate Y2A≈0) is shifted from the initial position Pi (the amount of displacement).

At step S9, the correction processing unit 62 compares the amount of displacement of the vanishing point 102 with a misalignment tolerance stored in the memory 64. If the amount of displacement is equal to or greater than the tolerance (step S9: YES), the process moves on to step S10. By contrast, if the amount of displacement is less than the tolerance (step S9: NO), it is determined that there is no misalignment in the reference direction 94, and the process ends.

At step S10, the correction processing unit 62 corrects the reference direction 94 indicated by the reference information 66. Here, the reference direction 94 is corrected so that the position P of the vanishing point 102 in the recognition zone 98 coincides with the initial position Pi. A way of correction for the case of misalignment in pan angle is illustrated below.

Figure 4A:
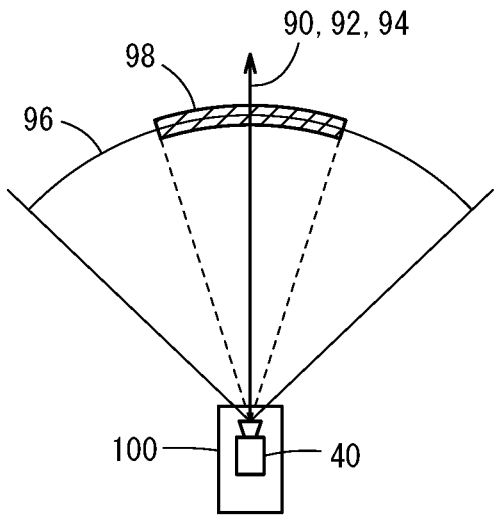
FIG. 4A illustrates various directions, the imaging range of a camera, and the recognition zone of an external environment recognition device when the posture of the camera is proper.

As shown in FIG. 4A, when the mounting posture (the pan angle) of the camera 40 on the vehicle 100 is proper (when the camera 40 is in the initial posture), the optical axis direction 92 of the camera 40 and the reference direction 94 of the external environment recognition unit 60 coincide with the front-back direction 90 of the vehicle 100. Under this condition, the camera 40 captures image information of an imaging zone 96 (FIG. 5A) centered in the optical axis direction 92, and the external environment recognition unit 60 recognizes image information of the recognition zone 98 (FIG. 5A) centered in the reference direction 94.

Figure 4B:
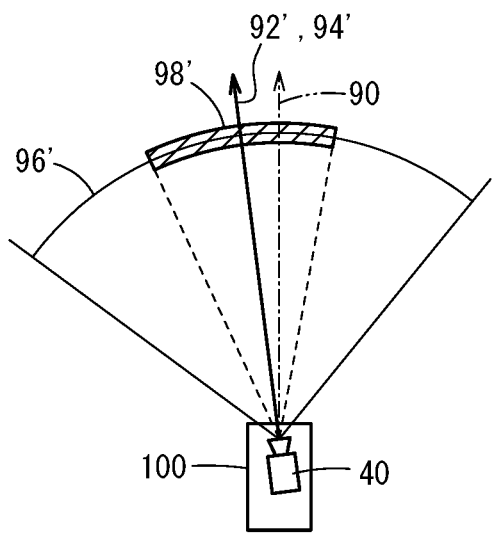
FIG. 4B illustrates various directions, the imaging range of the camera, and the recognition zone of the external environment recognition device when the posture of the camera is not proper.

As shown in FIG. 4B, when the mounting posture of the camera 40 on the vehicle 100 is not proper (when the camera 40 has been shifted from the initial posture), an optical axis direction 92' of the camera 40 and a reference direction 94' of the external environment recognition unit 60 do not coincide with the front-back direction 90 of the vehicle 100. Under this condition, the camera 40 captures image information of an imaging zone 96' (FIG. 5B) centered in the optical axis direction 92'. The external environment recognition unit 60 recognizes image information of a recognition zone 98' (FIG. 5B) centered in the reference direction 94'. In the recognition zone 98', the vanishing point 102 is not at the initial position Pi but at position P, displaced from the initial position Pi to the right.

Figure 4C:
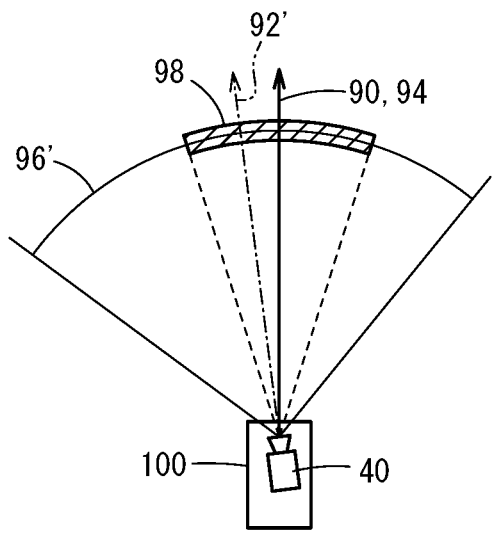
FIG. 4C illustrates a reference direction and the recognition zone after correction of the external environment recognition device.

The correction processing unit 62 determines a direction and an amount of correction for adjusting the initial position Pi in the recognition zone 98' to the position P of the current vanishing point 102. Then, based on the direction and amount of correction, it corrects the reference direction 94' of the external environment recognition unit 60. As a result of the correction, the position P of the vanishing point 102 within the recognition zone 98 coincides with the initial position Pi, as indicated by the broken lines in FIG. 5B. Also, as shown in FIG. 4C, the external environment recognition unit 60 is able to recognize image information of the recognition zone 98 (FIG. 5B) centered in the reference direction 94, that is, the front-back direction 90 of the vehicle 100.

2.2 Summarization of the First Embodiment

The external environment recognition system 12 according to the first embodiment includes: the satellite positioning device 46 configured to measure a position of the vehicle 100 by receiving radio waves transmitted from artificial satellites; the vehicle sensor 20 (yaw rate sensor 52) configured to detect or estimate a behavior of the vehicle 100; the external environment sensors 14 (camera 40) configured to acquire external environment information around the vehicle 100; and the external environment recognition device 22 configured to recognize the external environment information centered in the reference direction 94. The external environment recognition device 22 is configured to correct the detected value Y2 of the vehicle sensor 20 (the yaw rate sensor 52) based on positions of the vehicle 100 in temporal sequence measured by the satellite positioning device 46 and correct the reference direction 94 based on the corrected detected value Y2A.

Specifically, the external environment recognition device 22 determines a traveled trajectory L1 of the vehicle 100 based on the positions S1, S2, S3 of the vehicle 100 in temporal sequence measured by the satellite positioning device 46 (step S3), corrects the detected value Y2 of the vehicle sensor 20 (the yaw rate sensor 52) based on the traveled trajectory L1 (step S6), and corrects the reference direction 94 based on the corrected detected value Y2A (step S10).

With the configuration above, the detected value Y2 of the vehicle sensor 20 (the yaw rate sensor 52) is initially corrected using the satellite positioning device 46, which provides position measurement of high accuracy, followed by correction of the reference direction 94 of the external environment recognition device 22 using the corrected detected value Y2A of the vehicle sensor 20 (the yaw rate sensor 52). Thus, a misalignment in the reference direction 94 established for the external environment recognition device 22 can be accurately corrected. As a result, it becomes possible to accurately recognize the positions of recognition targets around the vehicle 100.

The external environment recognition device 22 also performs process to correct the reference direction 94 when the reliability of measurement by the satellite positioning device 46 is higher than a predetermined reliability. With this configuration, a misalignment in the reference direction 94 established for the external environment recognition device 22 can be corrected more accurately.

2.3 Variant 1 of the First Embodiment

Figure 6:
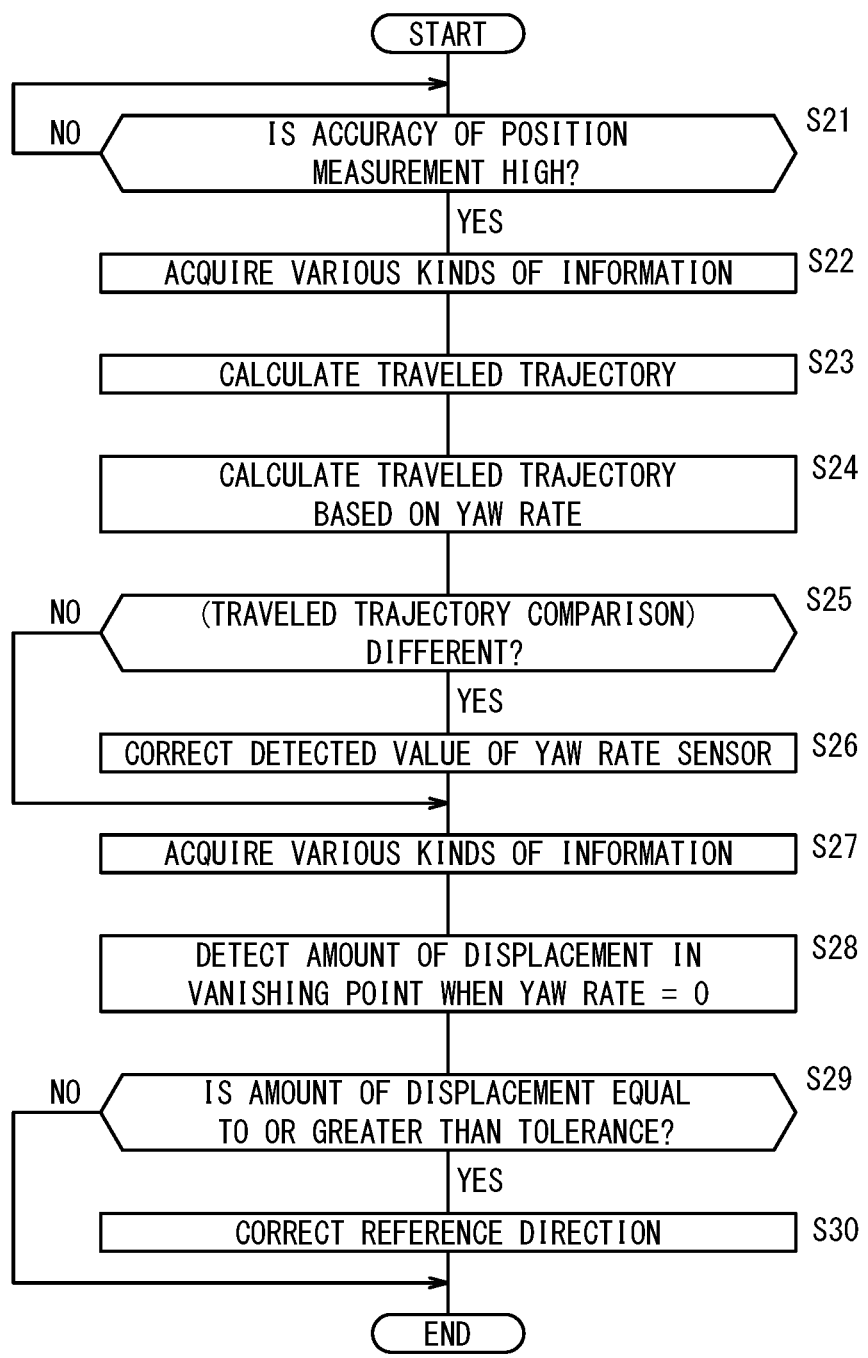
FIG. 6 is a flowchart of correction processing according to a variant of the first embodiment.

With reference to FIG. 6, a variant of the first embodiment is described. The external environment recognition system 12 may perform the operations shown in FIG. 6 instead of the operations shown in FIG. 2. The series of processes shown in FIG. 6 and those shown in FIG. 2 correspond with each other except for some processes. Herein, ones of the series of processes shown in FIG. 6 that are different from the series of processes shown in FIG. 2 are described.

At step S24 shown in FIG. 6, the correction processing unit 62 calculates a traveled trajectory L2 (see FIG. 3) based on the yaw rate Y2 detected by the yaw rate sensor 52. Then, at step S25, the correction processing unit 62 compares the traveled trajectory L1 calculated based on the positioning result of the satellite positioning device 46 with the traveled trajectory L2 calculated based on the yaw rate Y2 detected by the yaw rate sensor 52. This process may be performed in place of the steps S4 and S5 of FIG. 2.

2.4 Variant 2 of the First Embodiment

It is also possible in the first embodiment to correct some other vehicle sensor 20, for example, the speed sensor, the acceleration sensor, the lateral acceleration sensor, and the like, using the corrected yaw rate Y2A. The reason for initially correcting the detected value of the yaw rate sensor 52 in the first embodiment is that the yaw rate can be corrected most accurately. However, some other vehicle sensor 20 may be corrected first. Also, in addition to the optical axis direction 92 of the camera 40, the optical axis directions of the radar(s) 42 and of the LIDAR(s) 44 may be corrected.

3 Second Embodiment

3.1 Operation of External Environment Recognition System 12

With reference to FIG. 7, process performed by the external environment recognition system 12 according to a second embodiment is described. As in the first embodiment, the process shown in FIG. 7 may be executed when the driver performs a given operation, executed at a given timing, such as at the time of powering up of the vehicle 100, or executed periodically.

At step S41, the satellite positioning device 46 determines whether the accuracy of position measurement is high or not. Specifically, it determines whether the number of artificial satellites from which radio waves can be received is equal to or higher than a predetermined number stored in the navigation storage device 48. If the number is equal to or higher than the predetermined number, that is, if the reliability is high (step S41: YES), the process moves on to step S42. By contrast, if the number is less than the predetermined number, that is, if the reliability is low (step S41: NO), the process at step S41 is performed again.

At step S42, various kinds of information required for the correction process at steps S43 to S46 are acquired. The camera 40 acquires image information, and the satellite positioning device 46 measures the position of the vehicle 100.

At step S43, the correction processing unit 62 calculates the relative direction of a ground object 110 (see FIG. 5A, for instance) (the direction of the ground object 110 with respect to the position S of the vehicle 100) based on the positioning result (position S) obtained by the satellite positioning device 46 and on the map information 82 stored in the navigation storage device 48. The direction calculated here is called first direction D1. This process is performed when the external environment recognition unit 60 is able to recognize the ground object 110 within a predetermined range around the vehicle 100 based on the map information 82.

At step S44, the external environment recognition unit 60 recognizes the ground object 110 based on the image information, and the correction processing unit 62 calculates the relative direction of the ground object 110 recognized by the external environment recognition unit 60 (the direction of the ground object 110 with respect to the position S of the vehicle 100). The direction calculated here is called second direction D2.

At step S45, the first direction D1 and the second direction D2 are compared. If the first direction D1 and the second direction D2 are different (step S45: YES), the process moves on to step S46. By contrast, if the first direction D1 and the second direction D2 coincide (substantially coincide) with each other (step S45: NO), it is determined that there is no misalignment in the reference direction 94, and the process ends.

At step S46, the correction processing unit 62 corrects the reference direction 94 indicated by the reference information 66. Here, regarding the first direction D1 as the true value, a direction of correction and an amount of correction for making the second direction D2 coincide with the first direction D1, that is, the true value, are calculated. Using the direction of correction and the amount of correction, the reference direction 94 is corrected.

Figure 9A:
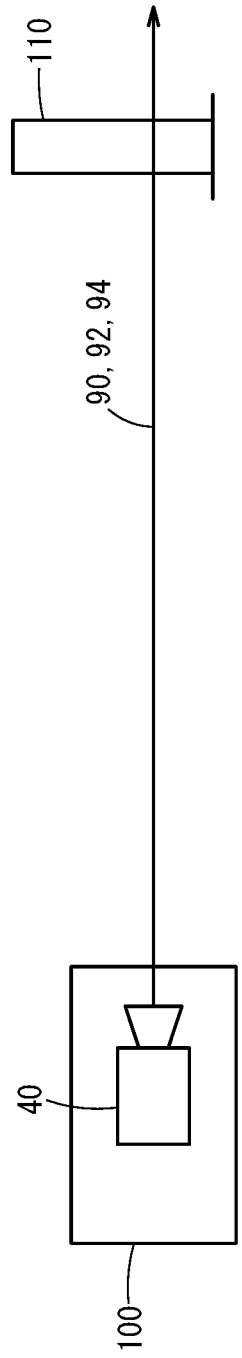
FIG. 9A illustrates the optical axis of a camera with a proper pitch angle and a ground object.
Figure 10A:
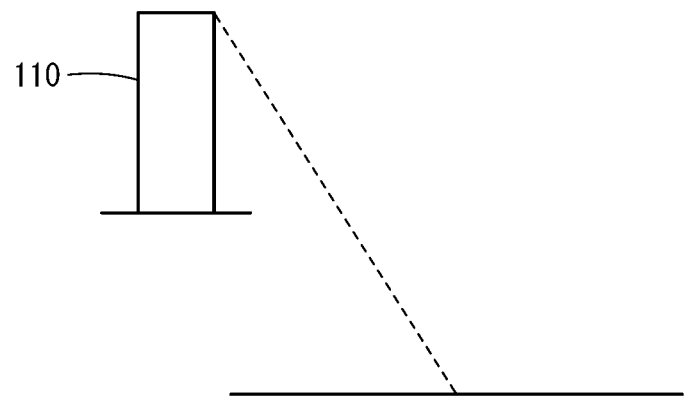
FIG. 10A illustrates a ground object captured with a proper roll angle.

As shown in FIGS. 8A, 9A, and 10A, when the mounting posture (the pan angle, pitch angle, and roll angle) of the camera 40 on the vehicle 100 is proper, the optical axis direction 92 of the camera 40 and the reference direction 94 of the external environment recognition unit 60 coincide with the front-back direction 90 of the vehicle 100. Under this condition, the camera 40 captures image information of the imaging zone 96 (FIG. 5A) centered in the optical axis direction 92, and the external environment recognition unit 60 recognizes image information of the recognition zone 98 (FIG. 5A) centered in the reference direction 94.

Figure 5B:
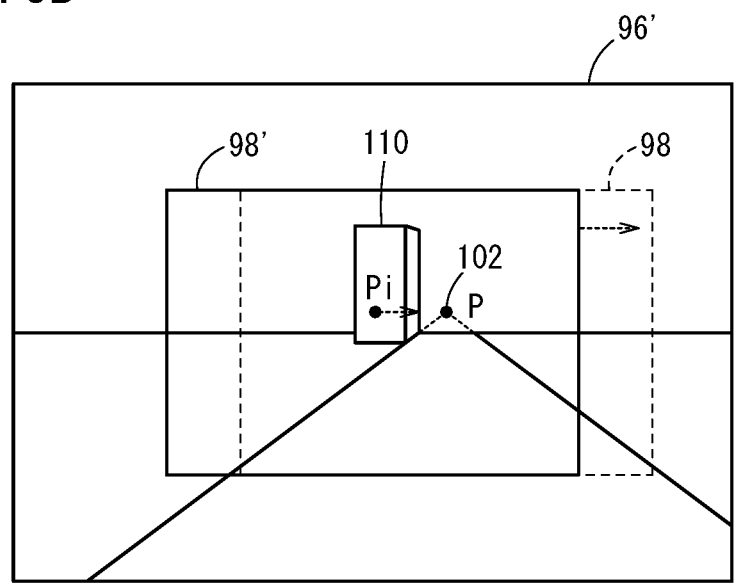
FIG. 5B illustrates an image and the recognition zone captured with an improper posture of the camera.
Figure 9B:
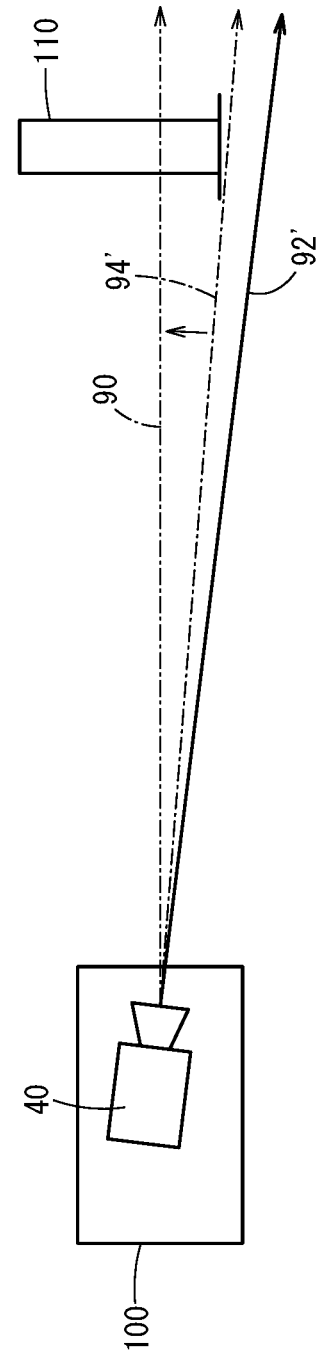
FIG. 9B illustrates the optical axis of a camera with an improper pitch angle and a ground object.
Figure 10B:
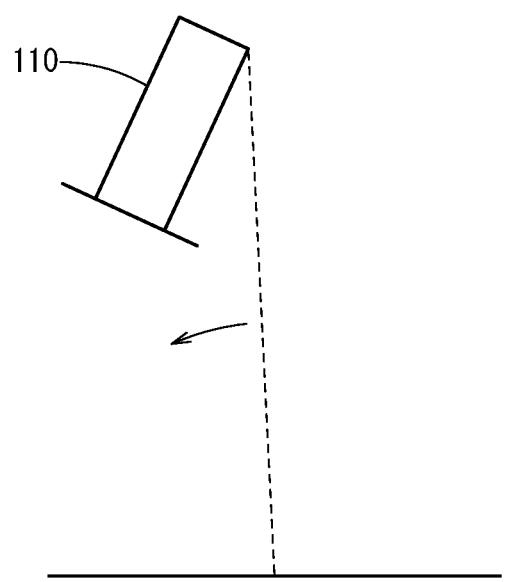
FIG. 10B illustrates a ground object captured with an improper roll angle.

As shown in FIGS. 8B, 9B, and 10B, when the mounting posture of the camera 40 on the vehicle 100 is not proper, the optical axis direction 92' of the camera 40 and the reference direction 94' of the external environment recognition unit 60 do not coincide with the front-back direction 90 of the vehicle 100. Under this condition, the camera 40 captures image information of the imaging zone 96' (FIG. 5B) centered in the optical axis direction 92', and the external environment recognition unit 60 recognizes image information of the recognition zone 98' (FIG. 5B) centered in the reference direction 94' (FIG. 5B shows a recognition zone 98' with misalignment only in the pan angle).

The correction processing unit 62 corrects the reference direction 94' of the external environment recognition unit 60 based on the position of the ground object 110 so as to coincide with the front-back direction 90 of the vehicle 100. As a result of the correction, the external environment recognition unit 60 is able to recognize image information of the recognition zone 98 (FIG. 5B) centered in the reference direction 94, that is, the front-back direction 90 of the vehicle 100.

3.2 Summarization of the Second Embodiment

The external environment recognition system 12 according to the second embodiment includes: the satellite positioning device 46 configured to measure a position of the vehicle 100 by receiving radio waves transmitted from artificial satellites; the navigation storage device 48 configured to store a position of the ground object 110; the external environment sensors 14 (camera 40) configured to acquire external environment information for the vehicle 100; and the external environment recognition device 22 configured to recognize the external environment information centered in the reference direction 94. The external environment recognition device 22 is configured to correct the reference direction 94 based on the position of the vehicle 100 measured by the satellite positioning device 46 and on the position of the ground object 110 stored in the navigation storage device 48.

Specifically, the external environment recognition device 22 may determine the relative direction of the ground object 110 with respect to the vehicle 100 based on the position of the vehicle 100 measured by the satellite positioning device 46 and on the position of the ground object 110 stored in the navigation storage device 48, and correct the reference direction 94 based on the relative direction.

With the configuration above, a misalignment in the reference direction 94 established for the external environment recognition device 22 can be accurately corrected because the reference direction 94 of the external environ- ment recognition device 22 is corrected using the satellite positioning device 46, which provides position measurement of high accuracy. As a result, it becomes possible to accurately recognize the positions of recognition targets around the vehicle 100.

As with the first embodiment, the external environment recognition device 22 performs process to correct the reference direction 94 when the reliability of measurement by the satellite positioning device 46 is higher than a predetermined reliability. With this configuration, a misalignment in the reference direction 94 established for the external environment recognition device 22 can be corrected more accurately.

In the process at step S44 of FIG. 7, the relative direction of the ground object 110 is measured most easily when the vehicle 100 is in a parked state. Thus, the processes of the second embodiment are preferably performed when the vehicle 100 is in the parked state.

It will be apparent that the external environment recognition system according to the present invention is not limited to the above embodiments but may adopt various other configurations without departing from the scope of the present invention.

The operation of the external environment recognition system 12 may be stopped if the amount of misalignment in the reference direction 94 has reached a certain amount or more, for example, if a ground object 110 which fits within a predetermined area (such as a center area) of the imaging zone 96 when there is no misalignment in the reference direction 94 has ceased to fit in the imaging zone 96, or if such a ground object 110 is positioned at an edge of the imaging zone 96.

The invention claimed is:

1. An external environment recognition system comprising:
    a satellite positioning device configured to measure a position of a vehicle by receiving radio waves transmitted from artificial satellites and provide vehicle position data in temporal sequence;
    a yaw rate sensor configured to detect a detected yaw rate of the vehicle;
    an external environment sensor configured to acquire external environment information around the vehicle; and
    one or more processors that execute computer-executable instructions stored in a memory and configured to access the vehicle position data, the detected yaw rate, and the external environment information,
    wherein the one or more processors execute the computer-executable instructions to:
        recognize the external environment information centered in a reference direction,
        determine a traveled trajectory of the vehicle based on the vehicle position data,
        calculate a calculated yaw rate based on the traveled trajectory,
        compare the calculated yaw rate with the detected yaw rate,
        correct the detected yaw rate to a corrected yaw rate using the calculated yaw rate, and
        correct the reference direction based on the corrected yaw rate.

2. The external environment recognition system according to claim 1, wherein the one or more processors correct the reference direction when reliability of measurement by the satellite positioning device is higher than a predetermined reliability.

* * * * *